United States Patent [19]

Senanayake

[11] Patent Number: 5,058,386

[45] Date of Patent: Oct. 22, 1991

[54] POWER GENERATION PLANT

[76] Inventor: Daya R. Senanayake, 9 Ecrin Place, Colombo 8, Sri Lanka

[21] Appl. No.: 476,451

[22] PCT Filed: Nov. 21, 1988

[86] PCT No.: PCT/LK88/00004
§ 371 Date: Jul. 9, 1990
§ 102(e) Date: Jul. 9, 1990

[87] PCT Pub. No.: WO89/04913
PCT Pub. Date: Jun. 1, 1989

[30] Foreign Application Priority Data
Nov. 26, 1987 [LK] Sri Lanka .................................. 9835

[51] Int. Cl.⁵ .............................................. F01K 9/00
[52] U.S. Cl. ......................................... 60/692; 60/670
[58] Field of Search ................. 60/669, 690, 692, 651, 60/671, 670

[56] References Cited

U.S. PATENT DOCUMENTS 3,393,515  7/1968  Tabor et al. ..................... 60/669 X
3,820,334  6/1974  Heller et al. ..................... 60/692 X

FOREIGN PATENT DOCUMENTS 53-32247  3/1978  Japan ..................................... 60/692
53-34039  3/1978  Japan ..................................... 60/692

Primary Examiner—Allen M. Ostrager
Attorney, Agent, or Firm—Horst M. Kasper

[57] ABSTRACT

A steam plant which includes a steam driven turbine, and a condenser in which the steam exhausted from the turbine is condensed, the condenser being at least 200 meters above the level of the turbine and preferably several kilometers above the turbine level. The turbine is connected to the condenser by a vacuum tight shaft adapted to convey the spent steam upwardly to the condenser at vapor speeds up to 0.75 of the speed of sound in that vapor. The condensate is continually withdrawn from the condenser both to maintain the vacuum and to stimulate continued mass transfer upwardly of the spent steam at high speed.

9 Claims, 5 Drawing Sheets

POWER GENERATION PLANT

This invention relates to a power generation plant, and in particular to an electrical power generation plant which includes a steam-driven turbine.

The advantages of an electrical power generation plant which includes a steam-driven turbine have been well documented. A steam turbine coupled to a generator for generating electricity, typically to supply a national electric grid, can provide an output substantially exceeding that of a gas turbine, oil engine or petrol engine, for instance over 1200 Megawatts (MW) for a single turbine; it can use a variety of fuels; a typical power-station steam turbine is designed to run for over 200,000 hours, which is many times the life of currently-available gas turbines. Whilst steam-driven turbines are without serious competition for high-power production, they are also widely used in low and medium power production plants.

Despite however the skills and efforts of successive generations of steam engineers, the efficiency of modern steam plant is still low, and steam usage high, and improvements are greatly needed; few commercial steam turbines convert more than 50% of the available fuel energy into useful work. In order to keep to a minimum the cost of each unit of electricity generated, it is the constant endeavour of steam engineers and plant designers both to minimise the specific steam consumption, and to maximise the thermal efficiency of the plant.

One known efficiency-improving technique is to operate with high-pressure steam cycles, but even the known practice of superheating the steam up to the metallurgical limit will not alone maintain turbine exhaust dryness fractions above 0.9, as is desirable if last row turbine blade erosion is to be kept within acceptable limits. Many existing plants therefore incorporate re-heat i.e. the high-pressure (superheated) steam is fed to a high pressure turbine, and expands to an intermediate pressure, whereupon the steam is re-heated at near-constant pressure back to a higher temperature, usually the original temperature, whereafter the steam is further expanded within a low-pressure turbine; since each kilogram of the steam does more work, less steam has to be used, whilst plant efficiency can be improved by up to 10%. Systems using re-heat typically use the highest possible turbine inlet pressure.

Even at atmospheric pressure, steam contains substantial energy. Thus many power generation plants are designed to exhaust the steam from the turbine outlet to a vacuum, for instance one created by a condenser using a coolant to take out most of the residual heat, with the steam re-appearing as water. Nevertheless, a main source of inefficiency in the steam cycle is still the heat thrown away in the spent steam, so it is important design consideration to keep this loss down by using as low an exhaust pressure as possible, including using as low a coolant temperature as possible.

Once the spent steam has been condensed, significant pumping power is required to bring the water up to boiler pressure, and this power is conventionally subtracted as "parasitic power" from that generated by the turbine.

One prior proposal to increase the efficiency of power generation plant which includes a steam-driven turbine is the 1892 German Pat. No. 70286 to Burnham. Exhaust steam from the steam turbine is condensed, and returned to the boiler by a stand pipe of height sufficient for the water pressure to equal the pressure in the boiler, whereby a lower boiler pressure can be used. A similar proposal is that of the 1982 Japanese patent application No. 59-119073 to Toshiba, wherein the condenser is at a height above the boiler sufficient for the water to flow to the boiler by gravity, thus obviating the need for a water pump and lowering the construction cost of the power plant. Another proposal was shown in the 1928 German Pat. No. 498700 to Schultz, wherein an underground boiler is warmed by geothermal heat, as a disclosed means of utilising the earth's heat; in response to fluid level gauges in the boiler and condenser, liquid is pumped from a condenser on or near the earth's surface, as and when required to replenish the water in the boiler (which will be in accordance with the rate of steam production or alternatively stated in accordance with the rate of energy transfer into the boiler and its rate of replenishment from surrounding rocks).

The 1975 French patent No. 7500483 to Goyat disclosed a means of utilising the earth's heat by providing a boiler at a geothermal location, and entraining the steam in an upwardly-extending shaft of length about 5000 m which terminated at a condenser adjacent the earth's surface; the condensate was to be returned to the base of the shaft (as and when required in accordance with the evaporation rate) by way of a water-driven turbine adapted to generate electrical power.

It is an object of our invention to permit an increase in the efficiency of an electrical power generation plant which includes a steam-driven turbine; we propose an arrangement with high pressure input steam to the turbine, and with exhaustion of used steam to vacuum, yet with a reduced parasitic take-off of electrical power from the turbine to achieve the respective above-atmospheric and sub-atmospheric pressures. Thus according to one feature of our invention we provide an electrical power generation plant comprising a turbine and a condenser, the turbine being of the steam-driven type and having a steam exhaust, the condenser having a vapour inlet and a liquid outlet, the steam exhaust of the steam turbine being at a level below the vapour inlet of the condenser and being connected to the said vapour inlet of the condenser by a vapour-transfer shaft, characterised in that the vapour transfer shaft is an upwardly-extending vacuum-tight shaft having a vertical height in the range 2 Km to 30 Km and a minimum cross-section of 2.75 meters, and in that means are provided adapted to maintain a sub-atmospheric pressure in the shaft during turbine operation.

Usefully the vacuum shaft will have a typical elevation difference between its ends of 5 Km; the minimum diameter of 2.75 meters will be adjacent the turbine steam exhaust, this diameter steadily increasing towards the condenser, so that the steam can be transferred at speeds up to 0.75× the speed of sound in water vapour, and conveniently of the order of 275 meters/second, upwardly to the condenser. Preferably the condenser has condenser legs or standpipes of minimum height 10 meters (in accordance with the pressure differential between the condenser vapour inlet and water outlet), with the condensed water being withdrawn from below the legs to maintain the condenser water level substantially constant in order to stimulate continued upward vapour transfer.

Preferably the water withdrawn from the condenser is fed towards the boiler water inlet. The hydrostatic pressure head created by having the condenser liquid outlet above the turbine steam inlet can result in three savings of power. Firstly, a small hydrostatic head compensates for the friction losses in the water downpipe. Secondly a larger hydrostatic head avoids the need for a separate water pump, to transfer and pressurise the water supplied to the boiler water inlet. Thirdly if there is an even greater hydrostatic head, as is likely with the larger elevation differences suggested for full utilisation of this invention, there may perhaps be too great a pressure for currently-available materials and the excess pressure can be used to generate additional electrical power if a water-driven turbine is inserted in the down-conduit. Thus with an increasing elevation difference the parasitic power required to operate a separate water pump and/or a geothermal injection pump is steadily reduced and/or a water turbine is added to generate additional electrical power.

As a particular feature of this invention, the reduction or elimination of (parasitic) pump power (on the turbine inlet down-side) is not counter-balanced by the need for additional pump power on the turbine exhaust up-side, because the spent steam is transferred as vapour by means of the vacuum shaft, continually stimulated by condensate withdrawal from the condenser. Because the condenser is at a higher elevation, the available coolant will generally be at a lower temperature, permitting a greater generated vacuum and/or a greater elevation difference.

It will be understood that existing power stations which are suitably-sited adjacent a mountain can readily be modified in accordance with the invention, with the vacuum shaft being led up the mountainside to a level where the condenser coolant temperature is substantially below that at ground level. Alternatively the vacuum shaft can be supported on a tower or tall building. However, we forsee that the present invention could have its widest application adjacent sources of geothermal energy, particularly from hot dry rocks, with the heat from the hot dry rocks being extracted by way of a known injection and production well system; preferably, geothermally heated water from the production well is used to pre-heat or help pre-heat the boiler water by way of a heat exchanger, located for instance adjacent a boiler positioned in a deep-well or mine shaft, well below ground level, with the condenser perhaps being at ground level. Preferably however the boiler/-turbine combination will be deep below ground level, and the condenser substantially above ground level, to provide the greatest possible elevation difference.

As a further feature of our invention, between the production well of a geothermal system and a steam turbine, we can provide a heating chamber or equivalent (for instance a pipe section) able to withstand high temperatures and pressures, and to which there is supplied supplementary heating, for instance parasitic electrical immersion heating derived from a turbine-driven generator, to further raise the temperature of the geothermally heated water or steam received from the production well up to the desired boiler temperature; such a supplementary heating arrangement can permit valuable use to be made of grade 2, i.e. lower temperature, geothermal locations, which currently are not ideally suited for commercial exploitation. Because the chamber location will normally be well below ground level, the chamber contents will be at high pressure and so will remain generally in the liquid phase despite being above their boiling point at atmospheric pressure; a proportion will thereafter flash into steam whilst passing through the steam turbine, to generate electricity.

We are aware of the disclosure of U.S. Pat. No. 4,201,060 to a method of generating electricity using a geothermal power plant; but the disclosure does not teach the use of a vacuum shaft; nor an elevation difference between the condenser and a turbine.

The invention will now be described by way of example with reference to the accompanying schematic drawings in which.

Figure 1:
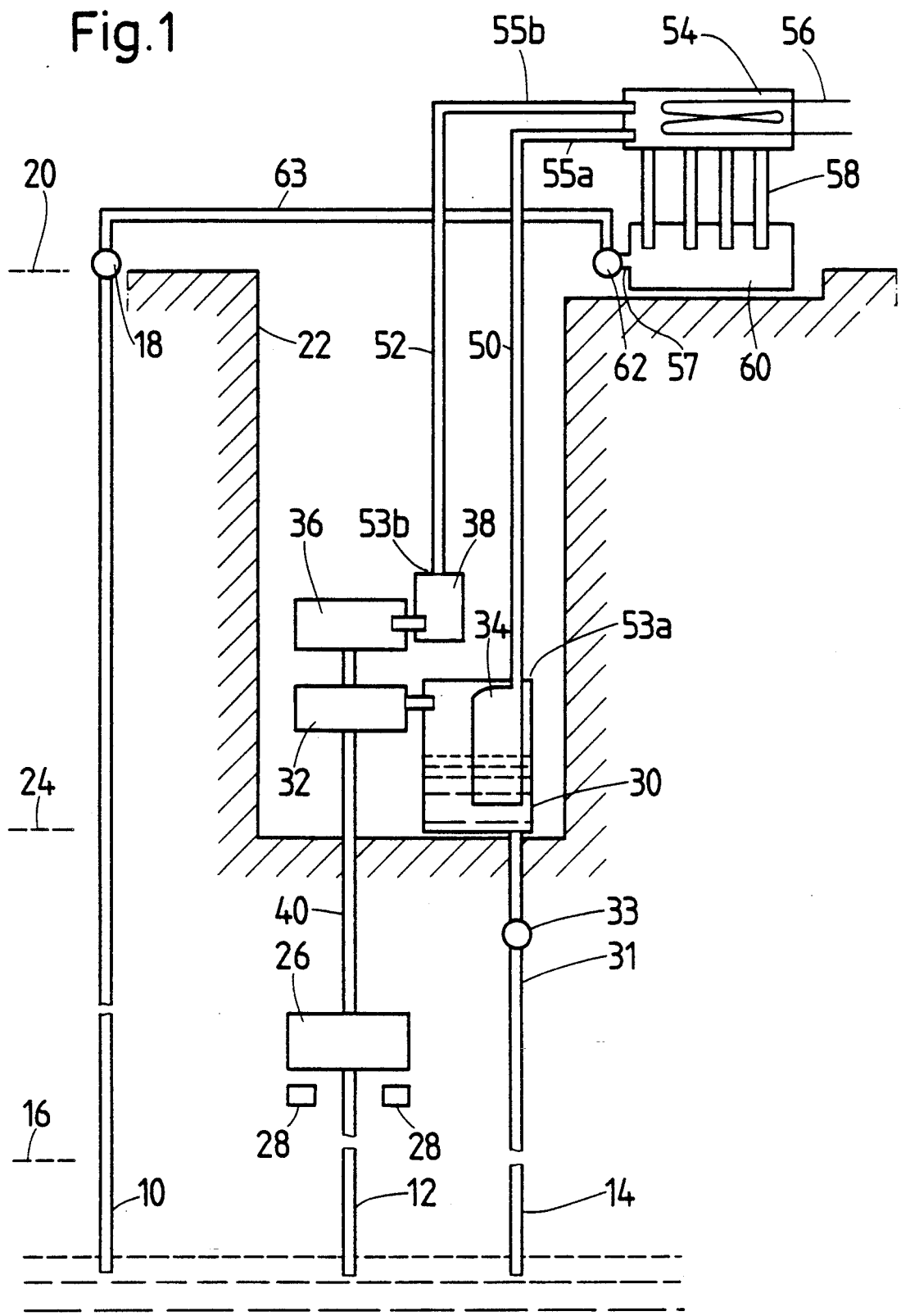
FIG. 1 is one embodiment of a geothermal system according to the invention.

As seen in FIG. 1, the electrical power generation plant includes a geothermal injection well 10 and a production well 12; though in an alternative embodiment there are multiple injection and/or production wells. Although the wells 10, 12 are shown extending vertically downwards with the fractured rock reservoir 14 horizontally disposed therebetween, in an alternative arrangement the wells can be inclined with the injection well below (usually vertically below) the production well.

For the geology at this site, the doublet wells 10, 12 are drilled to a depth of 6 km, which is below the depth 16 of the top of Hot Dry Rock heat reservoir 14, the depth 16 conventionally being selected as the level at which the reservoir temperature exceeds 200 degrees Celsius; typically, the top section of each well 10, 12 has a diameter of 44.45 cm, and encloses a steel casing of diameter 33.9 cm, with the annulular space therebetween filled with cement.

In use, water is forced down the well 10 (the injection well) by a pump or pump system 18, and the water then percolates though fissures in the Hot Dry Rock heat reservoir 14 and so becomes heated before being removed up the well 12 (the production well). In an alternative arrangement (for a more difficult site geology and/or as made acceptable by one feature of the present invention to utilise a lower geothermal reservoir temperature) the injection well 10 could have a diameter of 23 cm and be drilled to a depth of 4 Km to extract heat from a reservoir with e.g a temperature of (only) 150 degrees Celsius; the depth of drilling, and the temperature of the Hot Rock reservoir 14, will of course vary depending upon the site. It will be understood that the wells 10, 12 may be interconnected by any suitable method which permits the hydraulic fluid flowing therebetween to absorb geothermal heat, and may even be joined by way of a connecting pipe.

The production well 12 does not extend upwardly to ground level 20. It will be seen that from level 20, or the local ground level, there is excavated a deepwell 22 down to level 24. Deepwell 22 is conveniently of diameter 3 m, and level 24 in this embodiment is 1.5 km below level 20. In an alternative embodiment, there is more than one deepwell, each of which is open up to the level 20 and so is at or about atmospheric pressure and each of which is excavated to a level 24 at least 200 m below level 20, but usually substantially more.

Below deepwell 22 there is an insulated chamber 26 which is capable of resisting high pressures and temperatures; chamber 26 is at a level above the top 16 of the Hot Dry Rock reservoir 14, the top 16 being a minimum of 50 m below level 20 and a minimum of 10 m below level 24. In one embodiment chamber 26 is at a depth below level 20 of 1.5 km. Production well 12 is connected to chamber 26, so that the hydraulic fluid in chamber 26 is at high temperature and pressure; however the contents of chamber 26 can be further heated by supplementary heating means 28, which most conveniently is an electrical immersion heater, but which alternatively and as shown can heat the contents of chamber 26 through the chamber wall e.g. by one or more of a coal or wood or oil fired burner, as locally available and as convenient, so permitting the use of geothermal heat from grade 2 locations (with reservoir temperatures below 200 degrees Centigrade, though preferably above 150 degrees Centigrade), or alternatively of avoiding the need to drill to very great depths to reach reservoirs with temperatures above 200 degrees Centigrade e.g. avoiding the need to drill up to or beyond the current maximum known drilling depth (for an oil well in USSR) of 12 km. In an alternative embodiment, more than one chamber 26 is provided.

At or near the bottom of a deepwell 22 is a tank 30 receiving the hot liquid effluent from a water turbine 32. In communication with tank 30 is first vacuum chamber 34; and in communication with the outlet from a steam turbine 36 is a second vacuum chamber 38. The water turbine 32 and steam turbine 36 are fed from chamber 26 by way of a pressure-resisting insulated piperun 40, and a liquid/gas separator. In one example, the hydraulic fluid entering the turbines from pipe 40 has a minimum pressure of 2.01 kg/sq.cm (=30 psi=30×6.895 kPa), and the exit end of the turbines has a maximum (atmospheric) pressure of 1.02 kg/sq.cm (14.7 psi), to create a minimum pressure differential of 0.99 kg/sq.cm. In a more usual example, the turbine inlet pressure is above 19.53 kg/sq.cm (280 psi) and is at a temperature of 210 degrees Centigrade and the outlet pressure is 0.56 kg/sq.cm (8 psi) at 85 degrees Centigrade.

Connected to tank 30 is an ancillary bore hole 31 with an operating pump 33, so that any excess water can be pumped down to reservoir 14 and re-cycled.

Vacuum chambers 34, 38 are connected by respective conduits 50, 52 to a vacuum condensing chamber 54; conduits 50, 52 have one end 53a, 53b connected to respective chambers 34, 38 and their other end 55a, 55b connected to the chamber 54. The vacuum condensing chamber 54 is designed to dissipate heat, and so includes one or more cooling coils 56. Although not shown in the schematic drawings, in one embodiment saline water such as sea water is circulated in the cooling coil 56 and is thereby heated, to be removed for possible further heating and de-salination, whilst in a second embodiment fresh water is used and thereby heated, to be removed for use in a district or other heating scheme; in a different embodiment, saline solution is pumped down the injection well, the salt being left underground as the water evaporates before removal up the production well.

Condensing chamber 54 carries vacuum legs 58 which connect with a condensate reservoir or water tank 60. Pump 62 extracts water from tank 60 through condensate outlet 57, preferably to maintain the water in tank 60 or vacuum legs 58 at a substantially constant level, and then feeds it through line 63 to pump 18 in injection well 10; though in an alternative embodiment, the pump 62 could for example feed the water to a drinking supply. The removal of the water from the water tank 60 creates a (partial) vacuum in the vacuum legs 58, in the condensing chamber 54 and thus in the conduits 50, 52 (and which are therefore vacuum shafts) whereby to cause a flow of (evaporated) vapour in conduit 50, and of steam in conduit 52 i.e. there is a vacuum lift up to the vacuum condensing chamber(s) 54. Typically the pressure at the vacuum condensing chamber 54 is 0.14 kg/sq.cm (2 psi) whilst the pressure in the vacuum chambers 34, 38 is 0.6 kg/sq. cm (8.5 psi). To further aid the vapour flow towards the vacuum condensing chamber 54, perhaps over a distance of 1.5 km but in any case over a minimum distance of 200 m, the conduits 50, 52 can have a diameter of 7 m adjacent to the chambers 34, 38 and widening to a diameter of 10 m adjacent to the vacuum condensing chamber 54; the vacuum condensing chamber will have a diameter greater than that of the conduit i.e. greater than 10 m. In another embodiment, the vacuum chambers 34, 38 have a diameter of 6 m, and the conduits 50, 52 have a diameter adjacent the vacuum chambers 34, 38 also of 6 m and increasing to 12 m adjacent the vacuum condensing chamber 54. In the embodiment of the schematic drawing, the vacuum legs 58 have a minimum height of 10 m.

For start-up of the system, power will be required from outside the system. However, once started, such power may either be dispensed with or used to supplement the geothermal energy.

Figure 2:
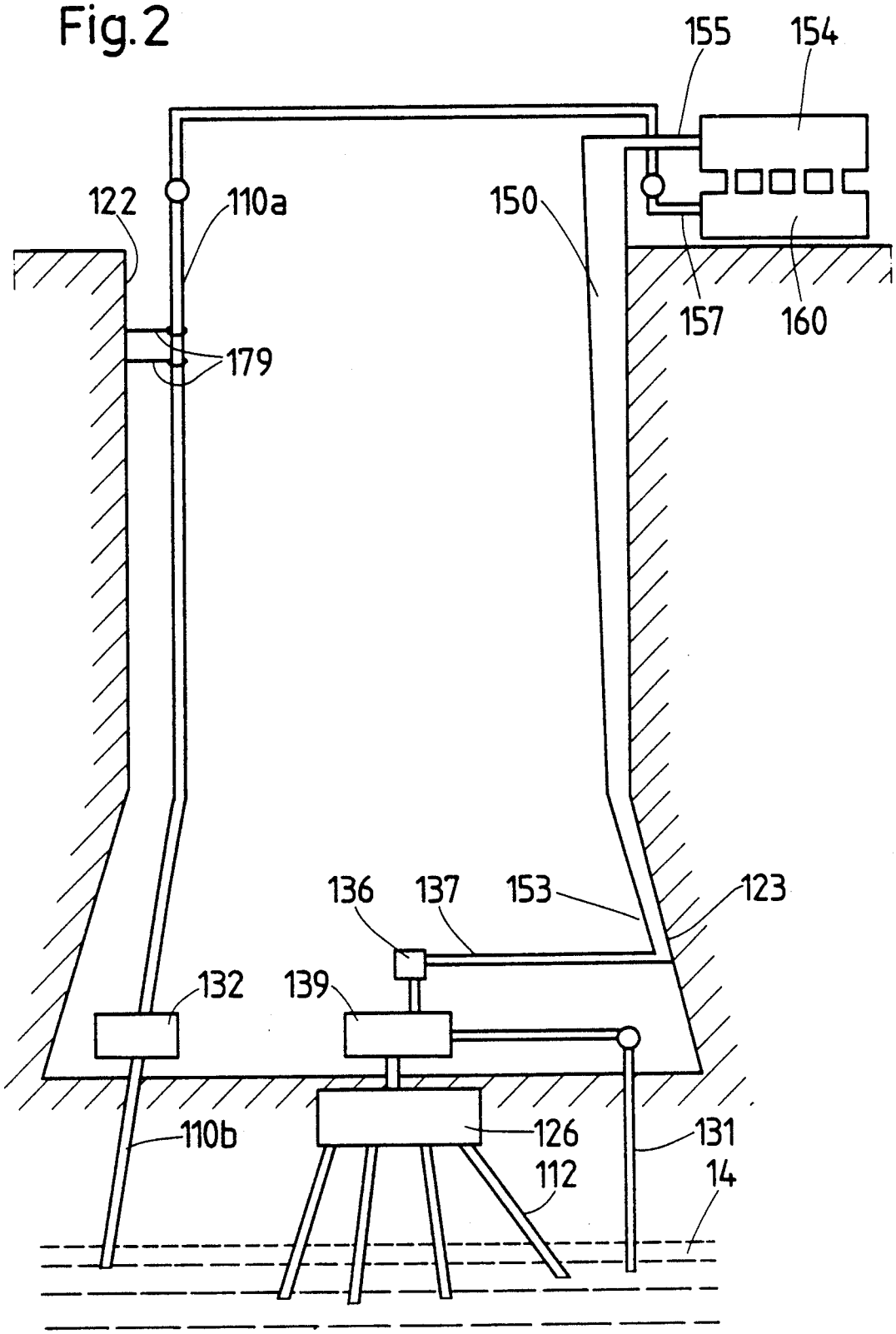
FIG. 2 is another embodiment of the invention.

In the embodiment of FIG. 2, conduit 110a is the upper section of an injection well, and leads to water turbine 132 located at or adjacent the base of deepwell 122 some 3 km below ground level; conduit 110b is the lower section of the injection well and leads from water turbine 132 into the geothermal reservoir 14. In this embodiment conduit 110a thus has a length of about 3 km, whilst conduit 110b has a length of 1 km. An advantage of this embodiment is that the or each injection well does not have to be drilled as a separate bore hole from ground level.

Figure 3:
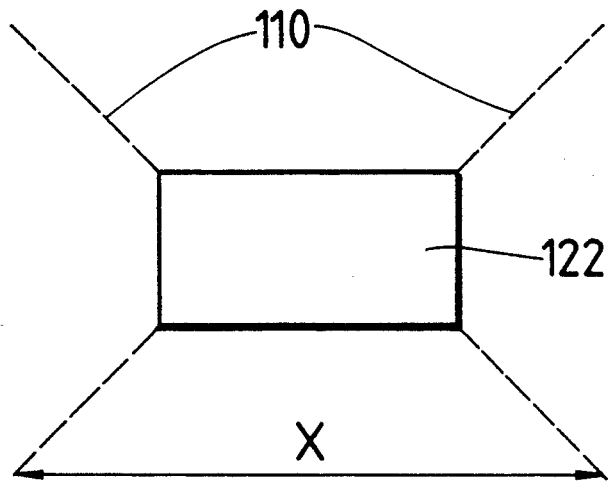
FIG. 3 is a plan view of an array of injection wells at a geothermal site.

In the alternative embodiment of FIG. 3, a plurality of injection bore holes 110b are drilled from the base of the deepwell, (again saving the expense of multiple drillings from ground level) at an angle to the vertical, so that the geothermal reservoir is tapped over a diameter X; in the embodiment of FIG. 3 X=3 km. Conveniently, during initial preparation, a drill rod will be threaded through guide brackets 179 fixed to the side walls of the deepwell, the guide brackets being in vertical sets; typically there will be sufficient sets disposed angularly around the deepwell for 36 injection wells, the sets in this embodiment at a depth underground of 2.5 km being splayed to follow the outward inclination 123 at the base of the deepwell 122 i.e. the inclination 123 starts at the 2.5 km level.

The outward inclination 123 forms an enlarged chamber at the bottom of the deepwell 122 for a power house. In the power house is a steam turbine 136 with steam outlet or exhaust 137. This power house also includes one or more separator/de-aerators 139, which feed the steam turbine with liquid heated to 210 degrees Celsius, and which are also connected to a further injection well 131 through which separated water (at or just below boiling point) can be pumped back down into the geothermal reservoir 14 for re-cycling. As in the embodiment of FIG. 1, the separator/de-aerators are fed with fluid from production well 12, by way of supplementary heating chamber 126.

As seen in FIG. 2, vacuum conduit 150 is partly formed by the wall of deepwell 122. The deepwell is an excavated and lined vertical shaft extending underground to a depth typically of between 2.5 km and 3.0 km; the deepwell will preferably be of sufficient cross-section to support a number of internal shafts (not shown) in addition to those already discussed, typically a lift shaft for a window lift cage, and up and down air shafts for ventilation of the power house, and such deepwell would usefully be about 11 meters in diameter. The supports 179 which were used during initial drilling as guide brackets for drill rod can be re-used as supports for the injection conduits 110a.

In use, for start-up, a basic charge of water is pumped down the injection well. The condenser 54 is filled with water, and the outlet 137 of steam turbine 136 is closed. Air is pumped out of the vacuum conduit 150 to lower the pressure therein to below atmospheric so that conduit 150 becomes a vacuum shaft; and as water is pumped out of the condenser 54 (but leaving water in tank 60 and vacuum legs 58) outlet 137 is opened, whereupon some of the water heated in the geothermal reservoir 14 (and if necessary in supplementary heating tank or chamber 126) issues as steam from outlet 137 into the base of vaccum conduit 150, and is stimulated to flow upwardly in the vacuum conduit because of the difference in pressure between the two ends of the vacuum conduit.

After start-up, in a typical installation water is pumped down the injection well e.g. at 900 kg/second, and heated in the geothermal reservoir 14 to about 150 degrees Centigrade; it is further heated to 210 degrees Centigrade in supplementary heating chamber 126, but because of the pressure it is under it remains substantially in the liquid phase. In passing through the separator/de-aerator 139, the steam turbine 136 and turbine outlet 137, about 15% of the liquid phase is converted to steam, with the residual 85% remaining as water at or just below 100 degrees Celsius i.e. its boiling point at atmospheric pressure; this residual water is re-cycled from the separator 139 back to geothermal reservoir 14 by way of a pump and injection conduit 131 where it mixes with further fresh water injected down the injection well 110a/110b. The geothermally heated water "mixture" returns to the steam turbine 136 by way of five or more doublets of injection/production wells so that in due course vapour issues from outlet 137 at a rate approaching 900 kgs/second i.e. approaching the mass transfer rate down the injection well. The speed of mass vapour transfer up vacuum conduit 150 is about 0.7 of the speed of sound in water vapour at that (vacuum) pressure, with a minimum suitable flow rate (if the cross section of the vacuum conduit is not to be too great) of 250 meters per second.

The water turbine 132 typically has an output of 12 MW, from an input pressure of 454 kg/sq.cm (6500 psi) and an output pressure of 0.14 kg/sq.cm (2 psi). The steam turbine has an output of 28 MW from 900 kg/second flashing to steam therethrough.

For sites at which the water from the production well is likely to be carrying dissolved salts, or other matter which over a period might create difficulties in the boiler and/or turbine, a heat exchanger can be located in the deepwell adjacent the boiler, to pre-heat the boiler water, usefully to preheat returned condensate from the condenser 54,154, with the spent "geothermal" water being re-injected into the Hot Rock system.

EXAMPLE 1

Figure 4:
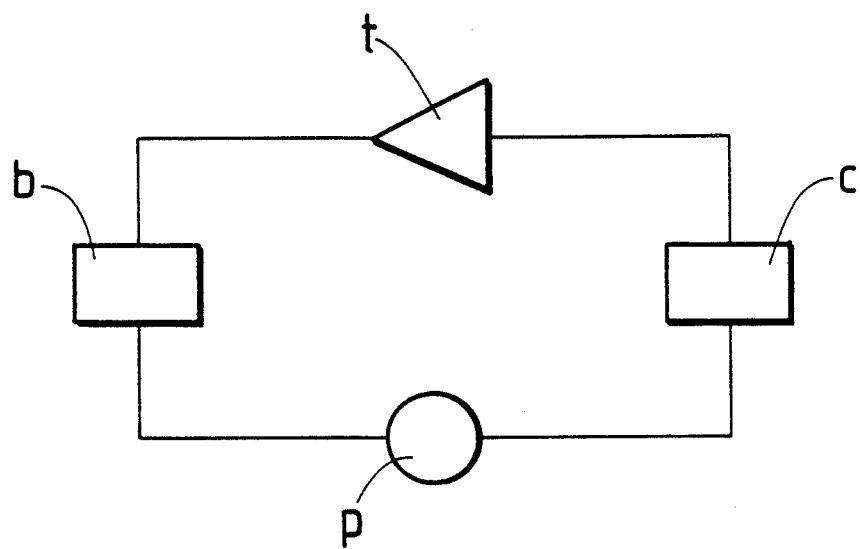
FIG. 4 is of a basic steam cycle.

(FIG. 4) - boiler b, turbine t, Condenser c and pump p.

1000 Kg of steam at a pressure of 22 MPa and a temperature of 750 degrees Celsius (C), is to be expanded to a pressure of 0.002337 MPa. The Entropy s and Enthalpy h figures are available from various source books - for instance "Thermodynamic & Transport Properties of Fluids" by Mayhew Y.R. & Rogers G.F.C. (Oxford) Basil Blackwell 1977, in particular at page 8 where the values of h and s at 22 MPa (220 Bar) are given, and thus by extrapolation:

h at 750 degrees C. = 3930
s at 750 degees C. = 6.891

Assuming isentropic expansion through the turbine, then the wetness fraction of the steam at the turbine exit can be obtained by dividing the difference between the entropy of the turbine inlet vapour and the entropy of the turbine exit vapour, by the entropy of fluid to vapour transfer i.e. (8.666−6.891) divided by 8.370 = 0.212

The enthalpy at the turbine exit can be obtained by subtracting the product of the wetness fraction and the fluid to vapour enthalpy, from the vapour enthalpy i.e. 2537.6 − 0.212 × 2453.7 = 2017.4

The thermodynamic work output from the turbine with a transfer flow of 1000 Kg/s is the difference between the inlet enthalpy and the turbine outlet enthalpy i.e. 3930 − 2017.4 = 1912.6 KJ/Kg To determine the boiler load, assume the condensation of the steam occurs at 20 degrees C at the exit of the turbine, into water at 20 degrees C., and that this water condensate is used as feed to the boiler.

Boiler feed enthalpy = 83.9
Boiler exit enthalpy = steam turbine inlet enthalpy = 3930

Boiler load = 3930 − 83.9
 = 3846.1 KJ/Kg
 = 3846.1 MW {for 1000 Kg/s steam flow rate}.

To determine the pump power, assuming 1000 Kg of water at 20 degrees C. and at 0.002337 MPa is to be pumped to 22 MPa Pump power = pressure × volume flow rate
 = pressure × mass flow rate/density
 = (22 − 0.002337) × 1m
 = 22MPa Net thermodynamic power = turbine power − pump power
 = 1912.6 − 22
 = 1890.6 MW.

Figure 5:
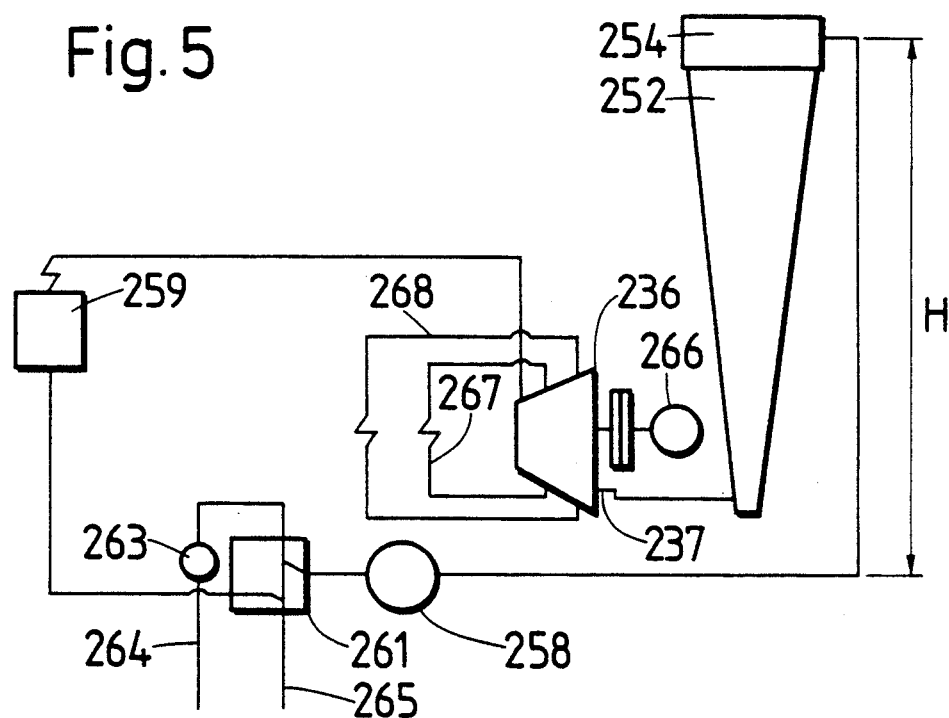
FIG. 5 is a schematic showing of a thermal power station according to the invention, with feed water pre-heating by way of a geothermal heat source.

As seen in FIG. 5, vacuum shaft 252 is used to transfer steam from the turbine exit 237 over a height difference H, up to the vacuum-leg condenser 254. Water pump 258 supplies boiler 259 by way of heat exchanger 261. Pump 263 draws geothermally-heated water from production pipe 264, and causes it to flow within heat exchanger 261 and then down injection well 265. Turbine 236 drives generator 266. Turbine 236 has a first re-heat line 267 and a second re-heat line 268.

PLANT CYCLE ASSUMPTIONS

Calorific value of coal 36 MJ/Kg.
Steam/Water circulation through boiler and turbine 1000 Kg/second
  Boiler efficiency 90%
  Turbine/Generator efficiency 75%.
  Pump efficiency 90%.
  Wetness fraction (low pressure end of expansion) 10%
  Height H of the vacuum shaft 2 Km

| | |
|---|---|
| Turbine feed steam - | inlet temperature 500 degrees Celsius (C.) inlet pressure 38 MPa, |
| Boiler feed water - | inlet temperature 225 degrees C. inlet pressure 38 MPa. |

EXAMPLE 1

This example relates to the arrangement of FIG. 5. System values are calculated for different turbine exhaust conditions i.e. Turbine outlet temperatures of 35; 40; 45; 50; 70 degrees Celsius (corresponding to outlet pressures of 0.00536; 0.00737; 0.00957; 0.0123; and 0.0312 MPa.)

The theoretical pump 258 power required (23MW) is calculated from the product of volume flowrate and the pressure drop across the pump 258 i.e $1000 \times (38-15)$KW. The 15 MPa contribution is approximated from the hydrostatic head for a 2 Km fall i.e. $2 \times 9.81 = 18.62$ MPa; less the frictional downpipe loss assuming three 225 mm diameter pipes for a flow of 1000 Kg/s, of 3.5 MPa.

The pumping power for the geothermal system is assumed as 17 MW. Thus the total theoretical pump power is $17+23=40$ MW, which means a (parasitic) uptake of 44.4 MW at 90% efficiency.

Figure 8:
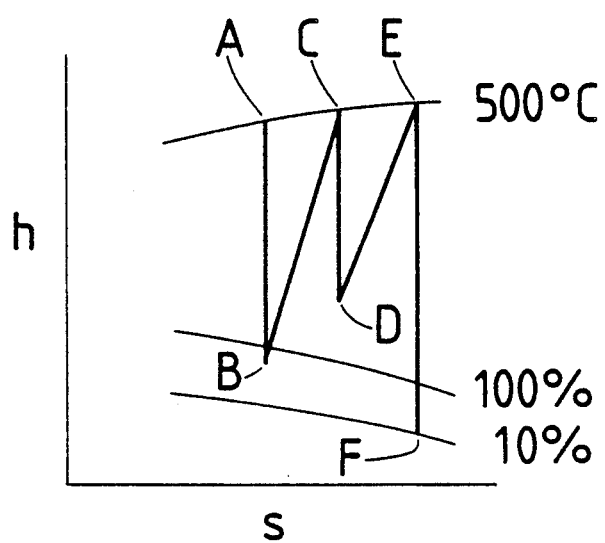
FIG. 8 is a graph plotting enthalpy against entropy for a two re-heat expansion steam turbine.

FIG. 8 plots enthalpy h against entropy s for a two re-heat system. The turbine inlet temperature is 500 degrees C.; the two lower lines represent a wetness fraction of 100% and 10% respectively.

The summed enthalpy difference is $(A-B)+(C-D)+(E-F)$KJ/kg.

The thermodynamic power output TPO from the cycle is the product of the steam flow rate in Kg/second, and the summed enthalpy difference, so that by substitution:

$$TPO = 1000 \times \{(2942.8 - 2807) + (3239 - 2649.2) + (3437 - 2322.7)\}$$
$$= 1875.9 \text{ MW}.$$

The power generated (75% efficiency) is thus 1406.9 MW.

The theoretical heat supplied to the cycle is the product of the flow rate and the enthalpy figure. The enthalpy figure is the difference between the enthalpy at A (FIG. 8) and at F, plus the enthalpy difference between C and B, and E and D and from known values is $1000 \times \{(2942.8-146.6)+(3239-2807)+(3473-2649.2)\}$ i.e. 4052.1 MW.

The geothermal contribution is the enthalpy difference between the boiler side of the heat exchanger and the condenser side and from known figures for the assumed conditions equals $972-108.8$ i.e.867.2 MW The theoretical external heat supplied to the cycle is thus the above theretical heat supplied reduced by the geothermal contribution i.e. $4052.1-867.2=3184.8$ MW.

The actual heat supplied is 3184.8/90% efficiency=3538.7 MW.

The coal consumption is thus $3538.7 \times 1000 \times 3600/36 \times 1000$
i.e. 353.87 tonnes/hour.

The coal consumption for each MW produced = 353.87/1362.5
= 0.2596 tonnes/hour.

For this configuration:

| EXIT TURBINE TEMPERATURE | THERMODYMAMIC AVAILABLE POWER | POWER GENERATED | PUMP POWER NEEDED | (A) POWER AVAILABLE |
|---|---|---|---|---|
| 35 | 1875.9 | 1406.9 | 44.4 | 1362.5 |
| 40 | 1828 | 1371 | 44.4 | 1326.6 |
| 45 | 1795.8 | 1346.8 | 44.4 | 1302.5 |
| 50 | 1736.6 | 1302.5 | 44.4 | 1258.1 |
| 70 | 1574.3 | 1180.7 | 44.4 | 1136.3 |

| THEORETICAL HEATER REQUIREMENT | GEOTHERMAL CONTRIBUTION | NET HEATER REQUIREMENT | (B) COAL USED | B/A |
|---|---|---|---|---|
| 4052 | 867.2 | 3184.8 | 353.86 | 0.2 596 |
| 3993.6 | 846.7 | 3146.9 | 349.66 | 0.2 635 |
| 3950.5 | 825.3 | 3125.2 | 247.2 | 0.2 666 |
| 3880.5 | 804.6 | 3076 | 341.78 | 0.2 716 |
| 3674 | 720.9 | 2953.1 | 328.1 | 0.2 887 |

In this example, since the (parasitic) power drawn from the grid to work the pumps is in each case 44.4 MW, so the power generated is in each case reduced by this amount, to give the available net power (MW). Coal usage is in tonnes per hour.

EXAMPLE 3

Figure 6:
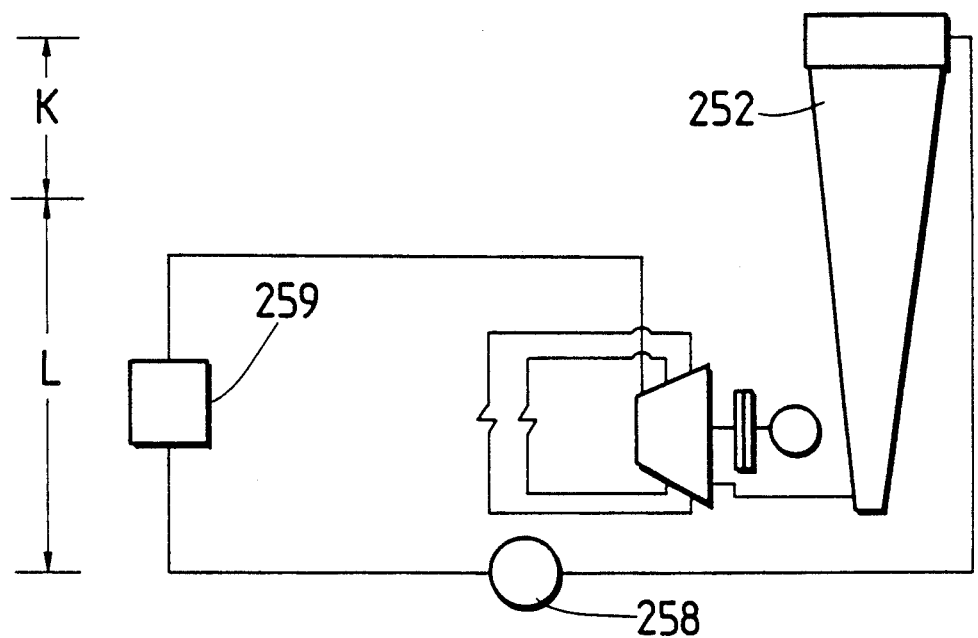
FIG. 6 is a similar configuration to that of FIG. 5 but wherein the thermal power station is at a substantial depth below the earth's surface.

This example relates to the arrangement of FIG. 6. It assumes the same temperatures and pressures as for Example 2, so that the power generated is the same as that for each corresponding turbine exit temperature (of Example 2). However, with a 5 Km hydrostatic head providing over 44.4 MPa, there is no requirement for parasitic power to be drawn from the grid for the pump 258, so the available net power equals the power generated. Also the heater requirement is the same as for the corresponding turbine exit temperature of Example 2, but since there is no geothermal contribution the external contribution must supply all the heat necessary; the coal consumption is thus increased, as is the ratio of coal consumption to net power output.

| EXIT TURBINE TEMPERATURE | (A) NET POWER | EXTERNAL HEATER REQUIREMENT | (B) COAL CONSUMPTION | B/A |
|---|---|---|---|---|
| 35 | 1406.7 | 4052 | 450.2 | 0.3 200 |
| 40 | 1871 | 3993.6 | 443.73 | 0.3 236 |
| 45 | 1346.8 | 3950.5 | 438.94 | 0.3 259 |
| 50 | 1302.5 | 3880.5 | 431.2 | 0.3 311 |
| 70 | 1180.7 | 3674 | 408.2 | 0.3 457 |

EXAMPLE 4

Figure 7:
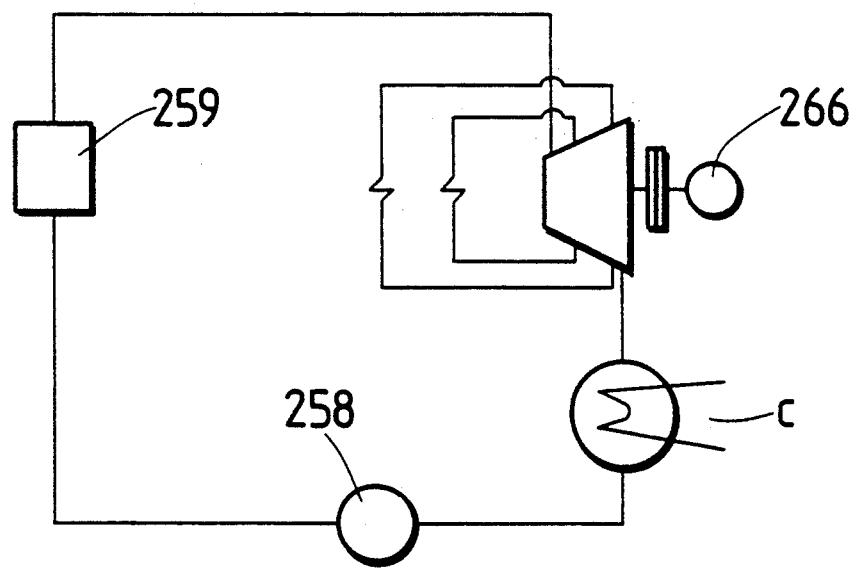
FIG. 7 is of a conventional (ground level) thermal power station.

The assumptions are the same as for Example 2, but relate to the arrangement of FIG. 7.

Two comparable turbine exit temperatures are given i.e. 50 degrees C and 70 degrees C. Figures for these higher exhaust temperatures only are compared, since the condenser is at turbine level, as therefore is the coolant.

The power generated for these turbine exit temperatures is the same as in examples 2/3, but the theoretical pump power required is 38 MW (i.e. actual power requirement 42.2 MW at 90% efficiency is to be subtracted). The theoretical heater requirement is the same as for example 3, as is therefore the actual coal consumption. But the ratio of coal consumption to net power output is lower than for examples 2/3.

| EXIT TURBINE TEMP. | POWER GENERATED | PUMP POWER | (A) NET POWER | THEORETICAL HEATER POWER | (B) COAL USED | B/A |
|---|---|---|---|---|---|---|
| 50 | 1302.5 | 42.2 | 1260.3 | 3880.5 | 431.17 | 0.3 421 |
| 70 | 1180.7 | 42.2 | 1138.5 | 3674 | 408.22 | 0.3 586 |

It will be understood that use of the vacuum shaft of my invention, with the condenser being positioned at an elevation significantly above that of the turbine and thus significantly above the elevation of the boiler, provides a substantial hydrostatic head or input pressure at the boiler inlet. The high differential pressure across the turbine permits a high turbine output, without the expected high parasitic pumping losses.

What is claimed:

1. An electrical power generation plant comprising a turbine (36, 136, 236) and a condenser (54, 154, 254), the turbine being of the steam-driven type and having a steam exhaust (137, 237, the condenser having a vapor inlet (55b, 155) and a liquid outlet (55a, 157), the steam exhaust of the steam turbine being at a level below the vapor inlet of the condenser and being connected to the vapor inlet of the condenser by a vapor transfer shaft (52, 150, 252), wherein the vapor transfer shaft is an upwardly-extending vacuumtight shaft having a vertical height in the range 0.2 kilometer to 30 kilometers and a minimum cross-section dimension of 2.75 meters, wherein means (54, 154, 254) are provided adapted to maintain a sub-atmospheric pressure in the shaft during turbine operation,
and further comprising a water boiler (26, 126, 259) having a water inlet conduit and a steam outlet conduit, wherein the steam-driven turbine (36, 136, 236) has a steam inlet, the steam inlet of the turbine being connected to the steam outlet of the boiler, and
wherein the liquid outlet of the condenser is connected to the water inlet conduit of the boiler.

2. An electrical power generation plant according to claim 1, wherein the cross-section dimensions of the vacuum transfer shaft are greater at the connection to the condenser vapor inlet (55b, 155) than at the connection (53b, 137, 237) to the turbine steam exhaust.

3. An electrical power generation plant according to claim 2, wherein the turbine is located at a distance below ground level exceeding 1 kilometer and in that the condenser is located at a distance above ground level also exceeding 1 kilometer.

4. An electrical power generation plant according to claim 1, wherein the turbine is fed by fluid under pressure supplied by a boiler, and wherein there is a heat exchanger (261) arranged to receive geothermally heated fluid to pre-heat water to be supplied to the boiler, the heat exchanger being located adjacent the boiler and turbine.

5. An electrical power generation plant according to claim 2, wherein the turbine is fed by fluid under pressure supplied by a boiler, and wherein there is a heat exchanger (261) arranged to receive geothermally heated fluid to pre-heat water to be supplied to the boiler, the heat exchanger being located adjacent the boiler and turbine.

6. An electrical power generation plant according to claim 3, wherein the turbine is fed by fluid under pressure supplied by a boiler, and wherein there is a heat exchanger (261) arranged to receive geothermally heated fluid to pre-heat water to be supplied to the boiler, the heat exchanger being located adjacent the boiler and turbine.

7. An electrical power generation plant according to claim 6, wherein condensate is withdrawn at a rate to maintain constant the condensate level in the condenser, and
wherein the withdrawn condensate is fed by gravity to a water-driven turbine (132).

8. An electrical power generation plant according to claim 7, wherein the vapor flow has a mass transfer velocity in the range 0.1 to 0.75 of the speed of sound in water vapor, at the vacuum pressure of the vapor being transferred.

9. An electrical power generation plant according to claim 8, wherein the vapor in the vacuum shaft is at a pressure in the range 0.0003283 to 0.099 MPa, and at a temperature in the range 5 to 99.9 degrees Celsius.

* * * * *